Dec. 1, 1964         P. H. HILGELAND         3,158,895
                SAUSAGE CUT-OFF DEVICES
Filed July 18, 1962                     3 Sheets-Sheet 1
FIG. I.
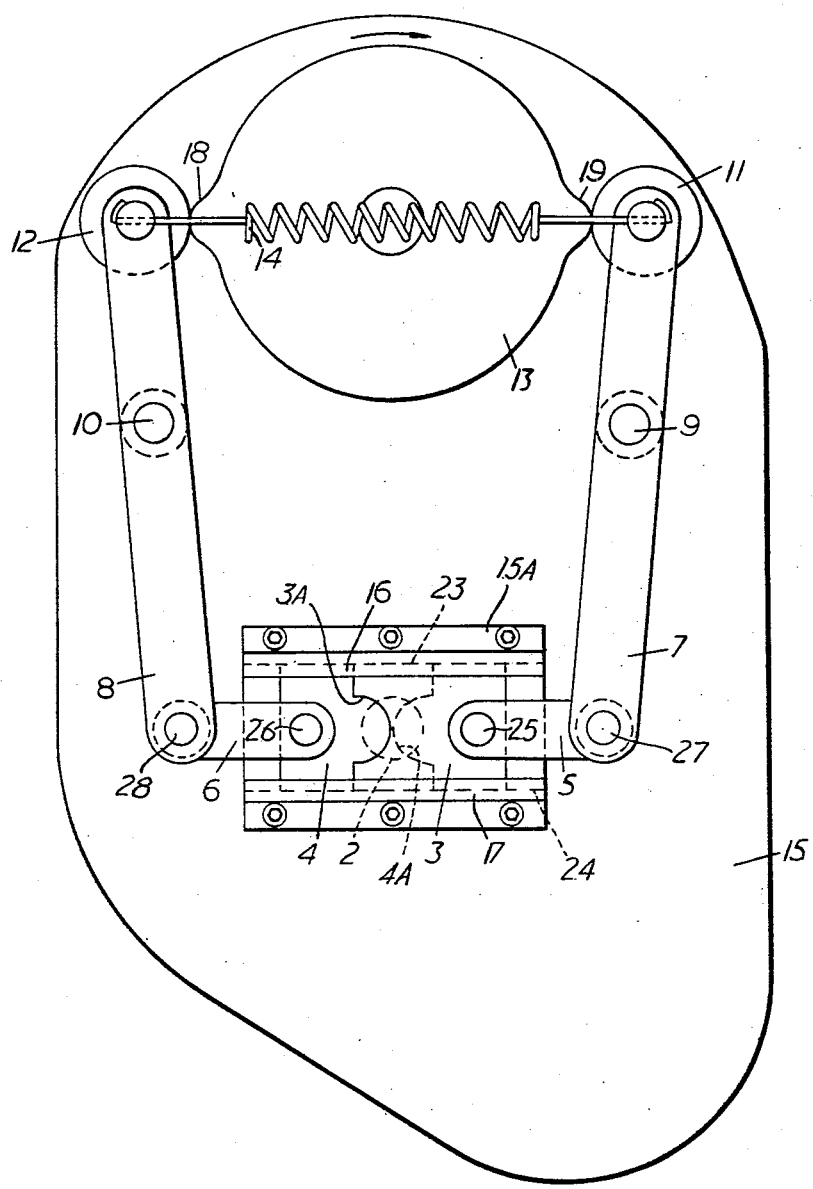
Inventor
Paul Helmut Hilgeland
Stevens, Davis, Miller & Mosher
                        Attorneys

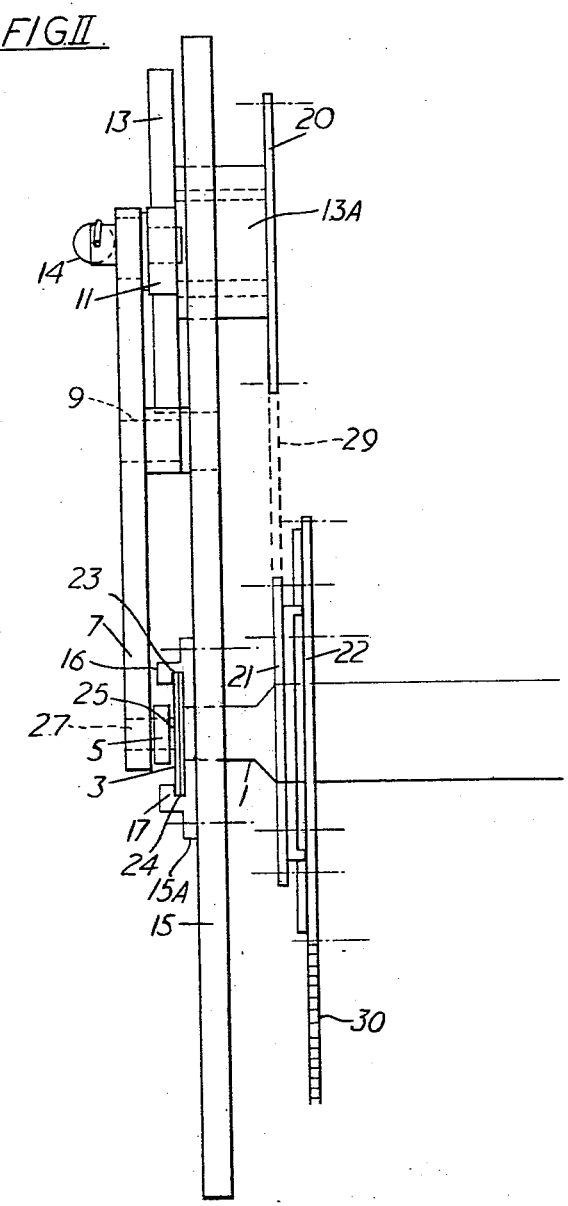

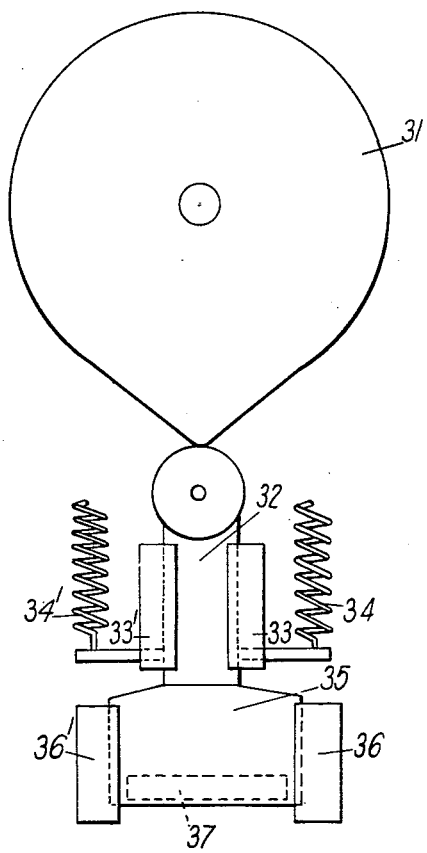

United States Patent Office 3,158,895
Patented Dec. 1, 1964

3,158,895
SAUSAGE CUT-OFF DEVICES
Paul Helmut Hilgeland, 2 Townsend Ave.,
London N.14, England
Filed July 18, 1962, Ser. No. 210,694
Claims priority, application Great Britain, July 21, 1961, 26,622/61
1 Claim. (Cl. 17—32)

This invention relates to cut-off devices of use in the manufacture of sausages.

In the manufacture of sausages, sausage meat is extruded in the form of a continuous cylinder which is regularly divided into sausage lengths. Known sausage meat extruders often comprise a device, known as a portioning device, for ensuring that the sausages are of equal volume. However, it is not possible with known apparatus to obtain properly shaped sausage portions and, while this irregularity is immaterial when the meat is to be filled into skins, it is a serious disadvantage when skinless sausages are to be made.

The present invention accordingly provides a device, referred to herein as a cut-off device, which in one embodiment may be used for neatly forming sausage meat extruded from a conventional portioner into sausage portions. Another embodiment may be used for cutting an extruded ribbon of ground beef into rectangular hamburger portions.

According to the present invention, a cut-off device comprises one or more cutting members adapted to be disposed next to a meat extrusion orifice and to move across the said orifice so as to cut the extruded sausage meat into shaped portions, the said cutting member or members being each connected to a pivoted arm engaging the surface of a rotating cam, this surface being such that at regular intervals the cutting member or members are brought across the orifice, to exert their cutting action, against the action of a device, such as a spring, which is provided to urge the cutting member or members away from the orifice.

Preferably the cut-off device has either two cutting members with concave edges which are adapted to move in opposite directions across the said orifice, or only one cutting member with a straight edge. The use of two cutting members with concave edges helps to ensure that sausage portions shaped therewith have neat ends. A single cutting member with a straight edge is advantageously used for cutting flat meat portions such as hamburgers.

A preferred form of cut-off device of the invention useful in the manufacture of shaped sausage portions is shown in FIGURES I and II of the accompanying drawings of which FIGURE I is a front view and FIGURE II a side view of the cut-off device, while FIGURE III shows diagrammatically a front fragmentary view of a preferred form of cut-off device for shaping hamburgers.

Referring to FIGURES I and II, a pair of cutting members 3 and 4 having concave cutting edges 3A and 4A, free to move in the slots 23 and 24 provided in upstanding edge portions 16 and 17 of a plate 15A secured to a main fixing plate 15, are pivotally connected at 25 and 26 to ties 5 and 6 which are themselves pivotally connected at 27 and 28 to lever arms 7 and 8, pivoted at 9 and 10 respectively to the fixing plate 15. At the other ends of the two lever arms, cam followers 11 and 12 are provided which are urged against the surface of a cam 13 by a tension spring 14.

A channel 1 (generally a tube of circular cross-section), for extruding sausage meat portions, having an orifice 2 across which the cutting members 3 and 4 having concave cutting edges 3A and 4A respectively move, is also provided.

The cam 13 is driven via wheels 20, 21, and 22. Wheel 20 is on the same shaft 13A as the cam 13 and is itself driven via a V-belt 29 by wheel 21 itself connected directly to wheel 22 for corotation therewith. Wheel 22 is connected via another V-belt 30 to the source of power (not shown). The shaft 13A is directly connected to and driven by wheel 20 and in turn drives cam 13.

In use sausage meat portions are extruded down channel 1 through orifice 2 past the open jaws of the cutting members 3 and 4, held open by the spring 14. The cam 13 rotates and twice each revolution the projections 18 and 19 engage the cam followers 12 and 11 (as shown in FIGURE I). When this happens the two cutting members are forced together against the action of the spring 14 and an extruded sausage meat portion is trimmed. When the projections 18 and 19 no longer engage the cam followers 12 and 11 the cutting members reopen and the next sausage meat portion is extruded until it is trimmed by the cutting edges 3A and 4A following the next engagement (half a revolution of cam 13 later) of the projections and the cam followers.

A suitable choice of the speed of rotation of the cam 13 and the rate of extrusion of the sausage meat through orifice 2 will allow sausages of any length to be made. The calibre of the sausage is, of course, determined by the diameter of the channel 1.

This cut-off device is especially advantageous for use in conjunction with a portioner-extruder of known kind in the high speed production of skinless sausages as in the method which is the subject of my co-pending application No. 210,695, filed July 18, 1962.

In FIGURE III, which shows a cut-off device for shaping hamburgers, a push rod 32 free to move in guides 33, 33′ fixed to a base plate 39 (shown only in part) and attached to a cutting member 35 is urged against the surface of a rotating cam 31 by springs 34, 34′ attached at their opposite ends to the base plate 39 by means not shown. The cutting member 35 is free to move in guides 36, 36′ back and forth across orifice 37 in base plate 39. In use the cam 31 rotates and forces the cutting member 35 across the orifice 37 when the projection 38 on the cam is in the position shown; as the cam 31 rotates further the springs 34, 34′ return the push rod 32 and hence the cutting member 35 and leave the orifice 37 open until the projection 38 again engages the push rod 32. Meat continuously extruded through orifice 37 is thus regularly cut into rectangular portions the exact shape of which is determined by the rate of extrusion of the meat and the speed of rotation of cam 31.

I claim:

A cut-off device comprising a plate defining a meat extrusion orifice and two parallel guide grooves on either side of said orifice, two cutting members having concave cutting edges and slidably guided in the said grooves, two ties pivotally attached to the said cutting members, one and only one tie being attached to each cutting member, two lever arms pivotally attached at one end to the said ties, one and only one lever arm being attached to each tie, two cam followers attached to the said lever arms at opposite ends to the said ties, one and only one cam follower being attached to each lever arm, a rotating cam the surface of which engages both cam followers, and a spring attached to the said lever arms so as to urge both cutting members away from the said orifice and both cam followers against the said cam, the surface of the cam being such that at least once every revolution each cutting edge is forced across the orifice against the action of the spring.

References Cited by the Examiner

UNITED STATES PATENTS

| 634,481 | 10/99 | Schultz | 146—81.5 |
| 1,881,171 | 10/32 | Cooley | 17—32 X |
| 2,832,410 | 4/58 | Soss | 146—159 |
| 2,926,557 | 3/60 | Ford | 17—32 X |

FOREIGN PATENTS 71,415  3/31  Sweden.

SAMUEL KOREN, *Primary Examiner.*

LUCIE H. LAUDENSLAGER, *Examiner.*